No. 607,019. Patented July 12, 1898.
H. COMER.
VALVE AND FLUID DISPENSER.
(Application filed June 23, 1897.)
(No Model.)
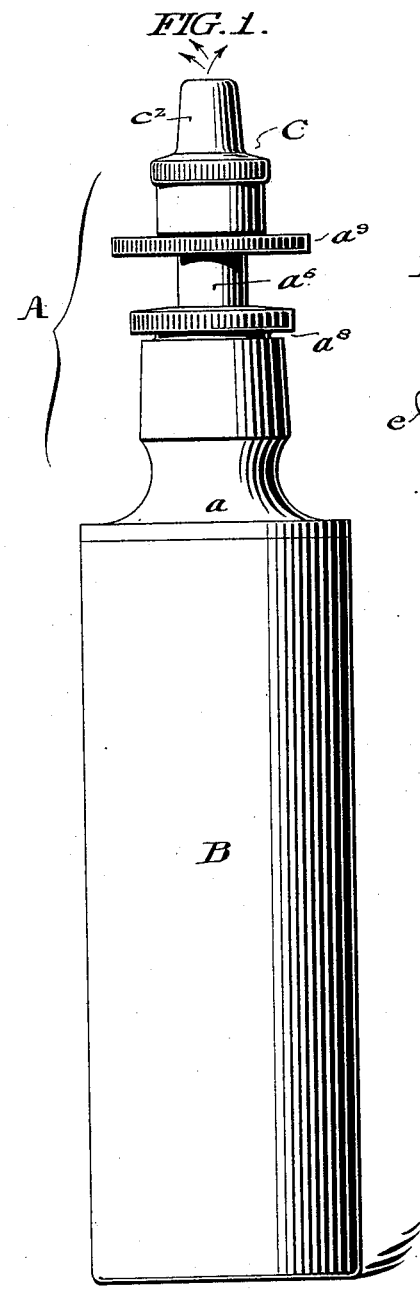
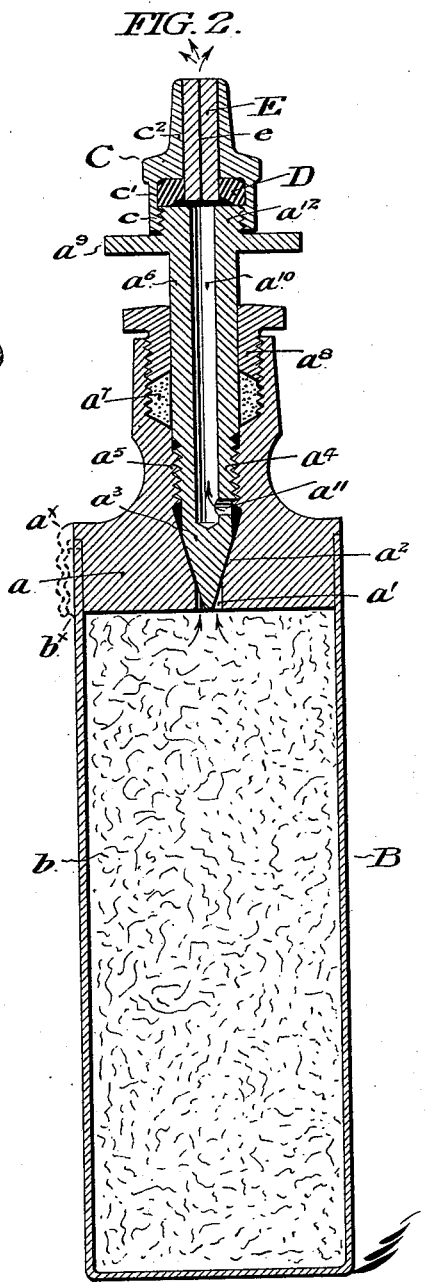
WITNESSES:
INVENTOR:
HARRIS COMER,

UNITED STATES PATENT OFFICE.

HARRIS COMER, OF PHILADELPHIA, PENNSYLVANIA.

VALVE AND FLUID-DISPENSER.

SPECIFICATION forming part of Letters Patent No. 607,019, dated July 12, 1898.

Application filed June 23, 1897. Serial No. 641,880. (No model.)

*To all whom it may concern:*

Be it known that I, HARRIS COMER, of Philadelphia, in the county of Philadelphia and State of Pennsylvania, have invented certain new and useful Improvements in Valves and Fluid-Dispensers, whereof the following is a specification, reference being had to the accompanying drawings.

My invention comprises certain features of construction of a valve of the class known as "needle-valves."

It is the object of my improvements to simplify the construction of such a valve, so that for a given capacity such a valve may have minimum exterior dimensions.

My invention also comprehends the embodiment of said valve in a fluid-dispenser, wherein said valve serves to regulate with precision the flow of fluid from a container, which said valve is also adapted to seal.

In the drawings, Figure 1 is a side elevation of a convenient embodiment of my improved valve in connection with a fluid-container. Fig. 2 is a central vertical section through the device shown in Fig. 1. Fig. 3 is a detail view of the fluid-outlet nozzle.

In said drawings, A is the valve, and B the fluid-container. The casing $a$ of said valve serves in this embodiment as one end of the container-casing. In said valve-casing is a passage-way $a'$, having a seat $a^2$ for a conical plug $a^3$. The said plug $a^3$ is accurately fitted to the seat $a^2$ and may be adjusted in relation thereto by rotation of its threaded portion $a^4$ in engagement with the corresponding thread $a^5$ in the casing $a$. The outer portion or stem $a^6$ of said plug $a^3$ is preferably smooth upon its exterior surface, the joint between the stem $a^6$ and the casing $a$ being hermetically sealed by means of the packing $a^7$ in the stuffing-box $a^8$. The stem $a^6$ may be conveniently rotated by means of the milled flange or head $a^9$. A longitudinal passage-way $a^{10}$ is provided in the stem $a^6$. Said passage-way having a lateral opening $a^{11}$ in the valve-stem above the conical plug $a^3$ serves as an outlet for the contained fluid when said valve-plug $a^3$ is raised from its seat $a^2$ by rotation of the milled head $a^9$.

The valve-stem $a^6$ is conveniently provided with a threaded extremity $a^{12}$, being thus adapted for connection with any apparatus into which it is desired to dispense the fluid from the container. When, however, it is desired to liberate the fluid upon its exit from the valve-stem $a^6$, I prefer to provide said stem with a nozzle-cap C. The said cap consists of a threaded base portion $c$, adapted to engage the threaded extremity $a^{12}$ of the valve-stem, the cap C being provided above said threaded portion with a space $c'$ for a compressible washer D. Above said space $c'$ the cap is provided with an extension $c^2$, adapted to inclose a cylindrical nozzle-piece E, having a capillary passage-way $e$ throughout its length.

For convenience of construction the nozzle-piece E may be made of glass tubing. The compressible washer D, preferably made of soft rubber, serves to grip the surface of the piece E, making an air-tight joint therewith when the nozzle-cap C is in position upon the threaded extension $a^{12}$ of the valve-stem $a^6$, as in Fig. 2.

The embodiment of my invention which I have shown and described is particularly adapted to contain and dispense a volatile fluid, with which the absorbent material $b$ is primarily saturated.

Although in the form illustrated the container B is designed to be permanently attached upon the valve-casing $a$, it is obvious that the container B may be made separable from the valve-piece $a$—for instance, by providing a screw-thread $b^\times$ upon its top, which is adapted to engage a corresponding thread $a^\times$ upon the base. Such a construction is desirable if the container B be made of glass.

It is furthermore obvious that other modifications may be made in my invention without departing from its essential features. I therefore do not desire to limit myself to the precise construction which I have shown and described.

I claim—

1. In combination; a casing, an opening in said casing provided with a valve-seat, a valve fitted to said seat, a screw-thread upon the stem of said valve, a corresponding screw-thread in said casing, a packing adapted to hermetically seal the joint between said valve-stem, and said casing, a longitudinal passage-way in said valve-stem, an inlet to said longitudinal passage-way, between said valve end, and said screw-thread, a head whereby said valve-stem may be rotated, an outlet from said longitudinal passage-way, a removable nozzle-cap for said outlet, and a separate nozzle-piece secured in said nozzle-cap, substantially as set forth.

2. In combination; a casing, an opening in said casing provided with a valve-seat, a valve fitted to said seat, a screw-thread upon the stem of said valve, a corresponding screw-thread in said casing, a packing adapted to hermetically seal the joint between said valve-stem, and said casing, a longitudinal passage-way in said valve-stem, an inlet to said longitudinal passage-way, between said valve end, and said screw-thread, a head whereby the said valve-stem may be rotated, an outlet from said longitudinal passage-way, a removable nozzle-cap for said outlet, a removable nozzle-piece mounted in said nozzle-cap, and a removable packing whereby said nozzle-piece is secured in said nozzle-cap, substantially as set forth.

3. In combination; a casing, an opening in said casing provided with a valve-seat, a valve fitted to said seat, a screw-thread upon the stem of said valve, a corresponding screw-thread in said casing, a packing adapted to hermetically seal the joint between the said valve-stem and said casing, a longitudinal passage-way in said valve-stem, an inlet to said longitudinal passage-way, between said valve end, and said screw-thread, a head whereby the said valve-stem may be rotated, an outlet for said longitudinal passage-way, a removable nozzle-cap for said outlet, a removable nozzle-piece, of glass, a capillary passage-way through said nozzle-piece, and means to secure said nozzle-piece in said nozzle-cap, substantially as set forth.

HARRIS COMER.

Witnesses:
A. E. PAIGE,
W. LETTINGER.